United States Patent [19]

Finkl

[11] Patent Number: 4,655,826
[45] Date of Patent: Apr. 7, 1987

[54] METHOD FOR POST-MELTING TREATMENT OF MOLTEN STEEL

[75] Inventor: Charles W. Finkl, Evanston, Ill.

[73] Assignee: A. Finkl & Sons Co., Chicago, Ill.

[21] Appl. No.: 859,851

[22] Filed: May 1, 1986

Related U.S. Application Data

[63] Continuation of Ser. No. 697,361, Feb. 1, 1985, abandoned.

[51] Int. Cl.$^4$ ............................ C21C 5/52; C21C 7/10
[52] U.S. Cl. ........................................ 75/10.66; 75/49
[58] Field of Search ...................................... 75/12, 49

[56] References Cited

U.S. PATENT DOCUMENTS

| | | | |
|---|---|---|---|
| 3,236,636 | 2/1966 | Finkl | 75/49 |
| 3,501,290 | 3/1970 | Finkl | 75/49 |
| 3,761,242 | 9/1973 | Finkl | 75/49 |

Primary Examiner—Peter D. Rosenberg
Attorney, Agent, or Firm—James G. Staples

[57] ABSTRACT

Molten steel is refined by a method that includes the steps of isolation from contact with the ambient and atmosphere, motion of the molten steel so that portions of the molten steel remote from the surface up to the surface, and addition of heat to the portions of the molten steel at the surface from a heating arc.

12 Claims, 1 Drawing Figure

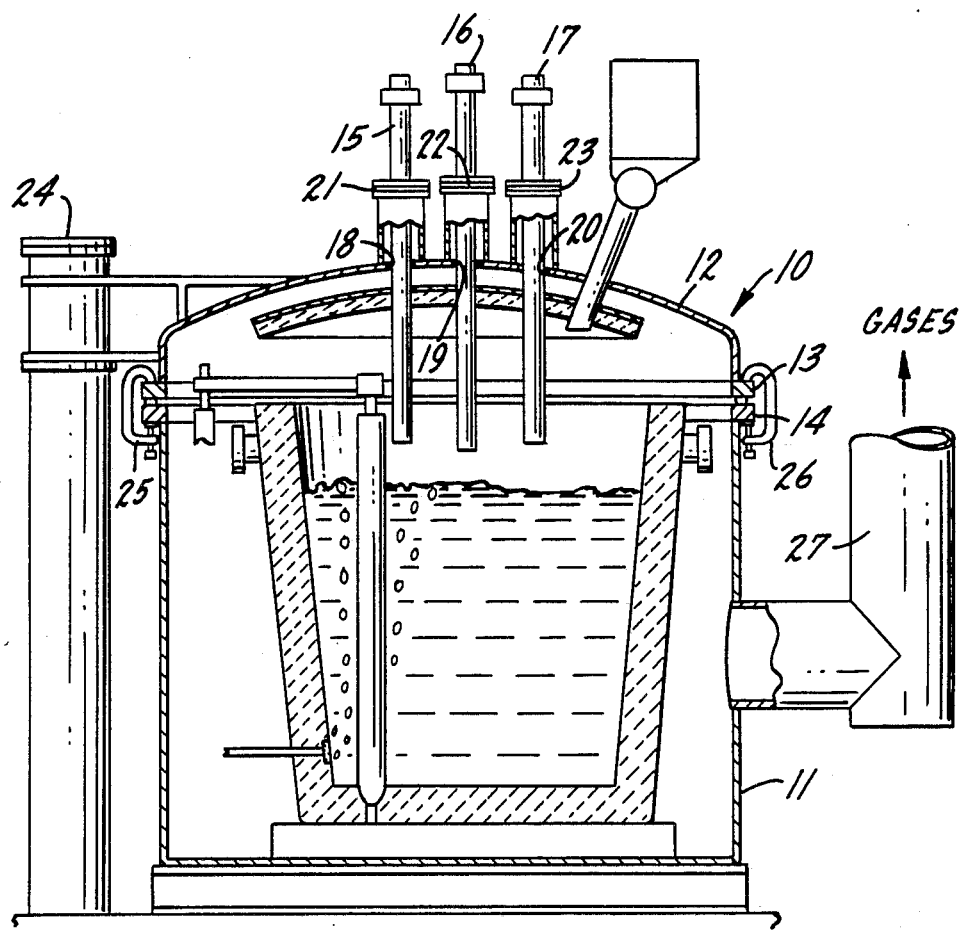

METHOD FOR POST-MELTING TREATMENT OF MOLTEN STEEL

This application is a continuation of application Ser. No. 697,361, filed Feb. 1, 1985, now abandoned.

SUMMARY OF THE INVENTION

This application relates generally to post-melting treatment of molten steel, and, in particular, to a method and apparatus for lowering the hydrogen, oxygen and, frequently, the nitrogen content of molten steel in a controlled atmosphere at substantially atmospheric pressure, or at least without the use of an artifically created, significant vacuum. A heat of electric furnace steel may, for example, be subjected to inert gas purging and, as needed, a heating arc is maintained in heat transferring relationship with the steel in a controlled atmosphere above the molten steel, which controlled atmosphere has the characteristic of being sealed from contact with the outside ambient atmosphere during operation. The controlled atmosphere, in addition to being characterized by lack of communication with the outside ambient atmosphere, will consist of the gases which are evolved from the melt, the gases which are formed as by-products from products evolved from the melt, and by the purging agent. The composition of the controlled atmosphere will vary during the course of the process.

BACKGROUND

Ladle metallurgy is perhaps the most widely used practice to enhance metal quality and productivity employed in the steel industry today. The term "ladle metallurgy" when used herein will mean post-melting processes which control post-melting temperatures and/or lower or control gaseous and metallic constituent contents of the steel. Among the processes currently known today are the following.

The vacuum arc degassing process, or the VAD process as it is often referred to, includes the subjection of a melt of steel to vacuum, a purging agent, such as an inert gas, and an alternating current heating arc struck and maintained between non-consumable electrode means and the molten steel. The process is described in several patents assigned to the assignor of this application, including U.S. Pat. Nos. 3,501,289, 3,501,290 and 3,635,696.

The so-called ladle furnace is also in use. This system includes the heating of molten steel at one station, usually by conventional electric arcs operating under conventional conditions including ambient atmosphere, and stirring (usually by an induction stirrer, but, also, sometimes assisted by a gas purge), plus a vacuum at a second station. This system has been offered by the Swedish firm ASEA.

Another furnace type system is the so-called Daido ladle furnace which involves, essentially, heating, usually with electric arcs, in an open or shrouded ladle using purging gas for stirring and a special slag to protect the bath. This process is believed to be exemplified by U.S. Pat. Nos. 4,371,392, 4,308,415 and 4,272,287.

And many steelmakers are employing do-it-yourself furnace heating systems by utilizing surplus parts from displaced arc furnaces, usually with the arc furnace shell replaced by a ladle.

All of these exemplary systems have certain common characteristics to a greater or lesser extent as follows.

All systems create fumes which must be captured, particularly during operation of the heating arc. Specifically, some fumes are quite dangerous, including, for example, carbon monoxide. The VAD process removes said fumes in a highly efficient manner since they are exhausted through the vacuum system, but the other systems appear to be somewhat less efficient in this respect.

The arcing in all of said systems may create a noise problem.

Those systems which require a vacuum at some stage in the process have the substantial additional capital costs connected with vacuum equipment and, of course, added maintenance costs associated with such equipment.

Those systems which utilize an unsealed container provide, unfortunately, ideal conditions for moisture pick-up by the steel, which primarily manifests itself as an increase in the hydrogen content, though an increase in oxygen content is also possible. Indeed, experience has shown that in a ladle which is partially enclosed (which may be the case when a normally vacuum tight tank fails to seal properly), the arcing causes a series of small explosions, or pulses, at a rate of on the order of about one per second and an amplitude of about plus or minus one-quarter inch water when observed on sensitive magnahelic pressure gauges. The explosion will blow gases out of the enclosure but likewise for each explosion there will be an implosion at less than atmospheric pressure which results in moist ambient air being sucked into the enclosure. The water vapor in the air yields its hydrogen to the steel. The amount of hydrogen pickup from the moist air need not be large to render the product unacceptable. For example, in a 65 ton heat of low alloy steel, the addition of a six ounce glass of water which will thereby raise the hydrogen content from the flake-free level of 2.0 ppm to the flake-sensitive level of 2.5 ppm can result in rejection of the final product. It will be understood that the pressure of the arcs bares the molten metal under the arc, thereby providing ideal conditions for the pick-up of hydrogen from the pulse of moist air which follows each explosion and consequent break in the integrity of the sealed enclosure.

It should also be noted that the explosion/implosion phenomenon in a well enclosed ladle, or even simply thermal drafts from a shrouded ladle, preclude the possibility of graphite or carbon from the electrodes burning out the oxygen and providing a very low oxygen environment above the bath.

And further, it should be noted that all such techiques are temperature sensitive. Even with ladle preheat, the initial heat sink of the ladle can cause stratified temperature levels which are deleterious to casting and solification rates, especially when the unit is used in conjunction with a continuous casting machine. Stirring ladles with an inert gas for temperature uniformity helps reduce the temperature stratification problem, but the stirring hastens the temperature drop in the ladle. Costly overheating in the melting furnace takes time and accelerates furnace refractory wear and renders processing so uneconomical that it is now avoided if at all possible.

SPECIFIC EMBODIMENT

The illustrated and described method and apparatus relies on a totally sealed environment, whether the molten metal containing receptacle is placed in a tank, or whether it is covered with an air tight hood or cover. The cover will be apertured to accommodate moveable electrode means, either singly or in unision. The electrode means may be contained in telescopic air tight cases or in fixed cases with moveable, polished rods which are operated through an air tight lock.

The sealed container provides an ideal low partial pressure environment to oxygen and hydrogen, which promotes the removal of both hydrogen and oxygen from the steel melt. In operation, as soon as the arc is struck, carbon from the electrodes will quickly burn the available oxygen to carbon monoxide. Inert gas purging also dilutes the atmosphere above the bath to a mixture of carbon monoxide, argon (assuming argon is used for inert gas purging), and nitrogen, thereby providing extremely low partial pressures with relation to oxygen and hydrogen. The result is a degassing of the bath, which degassing proceeds without any hydrogen pickup which is so typical of the above described non-sealed ladle heaters. The amount of degasification depends on time, purging rates and the operating pressure level.

It is well known to those skilled in the arc that flake-free hydrogen levels are only reproducible at two millimeters of mercury absolute or less as pointed out by Dr. Sieverts in his basic research. However, it has been discovered that considerable quantities of deleterious gases can be removed at atmospheric presssure, so long as the ladle container is air tight.

DESCRIPTION OF THE DRAWING

Referring now specifically to the Figure, 10 generally indicates a vacuum tank having a lower, stationary section 11 and an upper swing and lift cover 12. The cover 12 has a sealing flange 13 which mates with a similar sealing flange 14 on the lower section 11 when the flanges are placed in contact with one another. Heating means, in this instance three non-consumable alternating current electrodes, 15, 16 and 17, are carried in upper section 12.

The electrodes 15, 16 and 17 are here shown as elongated carbon or graphite rods, each of which is telescopically and slideably received in a matching opening 18, 19 and 20, respectively, in upper section 12. An airtight seal is formed around each of the electrodes, said seals being indicated at 21, 22 and 23 respectfully. Any suitable means, many of which are now well-known in the arc, may be employed for extending the electrodes towards the melt, and retracting them away from the melt to a point where they will clear the edge of the lower portion 11 when the lift and swing device 24 elevates the upper section 12, and swings it away at the conclusion of treatment. The illustrated electrodes are of course considered to be non-consumable as that phrase is currently understood and used in the art.

The lower and upper sections 11 and 12 are maintained in sealed engagement at all times by any suitable means which function to keep the sections in airtight, or, more accurately, outside ambient atmosphere tight engagement throughout the process. Here a plurality of conventional C-clamps 25, 26 are illustrated. Alternatively a very simple clamp consisting of a high speed vacuum type Roots blower with about a 4:1 compression ratio could be used to seal the chamber by exhausting gases in the sealed environment at a rate sufficiently rapidly to cause a very slight sub-atmospheric pressure to be generated within the enclosure, say on the order of a few milimeters of mercury, whereby atmospheric pressure would function to hold the flanges 13 and 14 in airtight engagement with one another. The Roots blower could also be used to carry away the carbon monoxide which is generated in the process and which becomes a particular problem if leakage occurs. Indeed, experience has indicated that concentrations of carbon monoxide of over 650 ppm may be present in selected areas around a vacuum tank while running the process due to leakage of the vacuum tank. It will be understood however that the clamping or seal-ensuring means must function to maintain a sealed enclosure and a consequent controlled atmosphere over the top of the molten steel during conditions of a slight excess of presssure over atmosphere within the enclosure, as well as conditions of a slightly lower than atmospheric pressure within the enclosure. An offtake for fumes is shown at 27, the offtake having the above mentioned Roots blower associated therewith if desired. Alternatively, if vacuum facilities are available, they may be connected to the offtake to ensure exhausting of the gases which are evolved during the process to a safe location.

It should be understood that although a tank into which a ladle of metal is placed has been selected for purposes of illustration, a system in which the ladle itself forms the lower portion of the sealed enclosure, and the upper section or hood 12 fits directly on a sealing flange carried by the ladle is within the scope of the invention.

The following specific examples show results from melts of steel which varied in size up to about 70 tons. (In all cases, treatment according to the principle of the present invention was accompanied by subjection of the steel to a very low absolute pressure on the order of a few milimeters of mercury absolute to ensure that hydrogen was lowered into the flake-free range for the specific steel under treatment. It should be understood therefore that in the event such low hydrogen levels are not required, the final low vacuum hydrogen treatment can be omitted.)

TABLE I

| Heat No. | Pres. (during non-vacuum portion of cycle) | Arc time (non-vacuum) | Before Controlled Atmosphere Arc | | | After Controlled Atmosphere Arc | | | After Deep Vac | | |
|---|---|---|---|---|---|---|---|---|---|---|---|
| | | | $H_2$ | $O_2$ | $N_2$ | $H_2$ | $O_2$ | $N_2$ | $H_2$ | $O_2$ | $N_2$ |
| 144232 | atm. | 15½ | 4.0 | 72 | 78 | 3.2 | 31 | 72 | 2.4 | 24 | 49 |
| 243906 | atm. | 25 | 2.7 | 94 | 89 | 2.1 | 54 | 87 | 1.9 | 38 | 83 |
| 144342 | atm. | 30 | 2.6 | 82 | 103 | 2.3 | 34 | 104 | 1.6 | 27 | 71 |
| 243969 | atm. | 31 | 3.0 | 87 | 88 | 2.2 | 50 | 88 | 2.0 | 42 | 79 |
| 243859 | atm. | 25 ap | 3.6 | 95 | 90 | .5 | 38 | 61 | .6 | 27 | 60 |
| 144214 | atm. | 10 | 1.1 | 0 | 0 | .5 | 0 | 0 | .3 | 41 | 75 |

TABLE II

| Heat No. | Wt. tons | C | Mn | P | S | Si | Ni | Cr | Mo | V | Slag Vol. | Boil | Temp Before/After Non-Vac Arc, °F. |
|---|---|---|---|---|---|---|---|---|---|---|---|---|---|
| 144232 | 65 ap. | .46 | .78 | .012 | .007 | .29 | .49 | .46 | .14 | .006 | | | 2930 |
| 243906 | 70 | .52 | .84 | .010 | .020 | .28 | 1.21 | .99 | .39 | .059 | thick | wild | |
| 144342 | 70 | .48 | .90 | .013 | .044 | .28 | .26 | .54 | .16 | .047 | ave. | ave. | 2940 / 2990 |
| 253969 | 60 | .23 | 1.08 | .015 | .018 | .29 | .58 | .54 | .19 | .052 | | | 2870 / 2970 |
| 243859 | 67 | .55 | .95 | .010 | .019 | .27 | .90 | 1.10 | .35 | .057 | ave. | ave. | 2860 / 2840 |
| 144214 | 65 | .40 | .78 | .009 | .017 | .21 | 1.74 | 1.04 | .30 | .058 | min. | ave. | 2830 / 2860 |

The processing of heat 144214 was as follows.

A ladle with an approximately 65 ton melt of 4340 steel with a minimum slag cover was placed in a vacuum tank of the type illustrated in the Figure. The melt had been tapped from the electric furnace at 3100° F. and the temperature in the tank was 3040° F. as measured by an immersion thermocouple. Since this temperature was, in this instance, undesirably high, the cover was closed, the vacuum system activated, and a vigorous argon purge employed to lower the temperature. After 30 minutes the temperature had dropped to the acceptable value of 2830° F. and the hydrogen content was then measured at 1.1. (The hydrogen drop in this preliminary step was from 3.8 to 1.1 and the final vacuum was about 600 mm Hg absolute.)

The processing here relevant then commenced. An alternating current 3-phase heating arc was struck between non-consumable graphite electrodes and the melt (as in all other heats in the table) and maintained for ten minutes. The power factors were as follows: 5 MW at 3–3½ MVars, 205 volt; the average amperage per electrode as 14,000–20,000 amps. During the ten minute arcing period the pressure in the tank was observed to vary between 0.02" H$_2$O negative to 0.05/0.1" H$_2$O positive. The melt had a thin layer of conventional slag thereon.

A more vigorous than usual purge was employed. Specifically a purging rate of up to three times the normal 3–5 cu ft/min rate was employed.

At the conclusion of the ten minute arc and purge period the temperature was 2860° F. by immersion thermocouple and the hydrogen content was 0.55 ppm.

Since the temperature was still higher than the desired teeming temperature, the melt was again subjected to a vacuum and vigorous purge for five minutes, to drop the temperature to the desired teeming level and the melt was then further processed in a conventional manner.

The processing of heat No. 243859 was varied for testing purposes in that the procedure was reversed; i.e.: the deep vacuum was run first, and thereafter the arc was run at atmosphere. The results indicate that there is no hydrogen pickup on reheating. There was a pickup of nitrogen; however, this is not considered as significant as a pickup in hydrogen since, in the vast majority of steels, an excess of hydrogen is a far more deleteriously significant result than a high nitrogen content.

The processing of heat 144232 involved the following steps.

After placement in the sealed enclosure, an argon purge was started. Power readings taken during the protected arcing phase showed an average of 20,000 amps at 200 volts using 5 megawatts and 3 mega vars.

The pressure gauges which record the pressure in the sealed enclosure disclosed variations, in terms of inches of water, of from a negative 0.05 inches to a positive 0.1, with a substantial portion of the time at about 0.05 inches.

In heat 243906 the argon purging rate varied. At the 12 minute mark the power readings were: Kilo Amps 17/17/17, Megawatts 5, MegaVars 4 and 220 volt AC.

In heat 253969 the following processing was carried out after the ladle was transported to the seal enclosure.

Fuller tests, including temperature and metallurgical samples, were done. The vacuum tank cover was put in place and the heat was arced for 30 minutes with the vacuum system completely shut off. Pressure, argon flow, electrical valves, and other data were taken.

The vacuum tank lid was then opened and full tests were taken again.

The cover was closed again and a "normal" vacuum degassing process was started. A degassing cycle at 17 minutes was chosen to lose heat (desired to lose about 110° F.).

Although initially steam pressure was above 100 psi in the vacuum system, as required for good operation, it was noticed by the pit foreman about four minutes into the 17 minute cycle that pressure had dropped to 60 psi. The steam fitter got the pressure climbing again but it dropped again to 50 psi until about 7 or 8 minutes into the cycle when it climbed above 100 psi and stayed there.

When the vacuum degassing cycle was finished the tank lide was opened and temperature taken. Alloys were added and then full tests were taken (temperature and metallurgical samples). The power data was consistently about as follows: 10/14/19 Kilo Amp; 220 volts; 5.2 Megawatts; 3.4 to 5 MegaVars.

After the arc was turned off, a top valve was opened to commence bleeding off CO. After the CO bleed was concluded the tank seal was broken and purging continued for, in this instance, the cooling of the metal to a lower temperature. Tests were taken about two minutes after the tank seal was broken.

From the above the following general considerations may be drawn.

With a sealed enclosure, i.e.: one which precludes contact between outside ambient atmosphere and the steel undergoing treatment, and a vigorous purge, one ppm of hydrogen can be removed in a period of 15–30 minutes from heats in the vicinity of 65 tons; further, oxygen can be lowered from 30 to 50%. It may even be possible to operate at a slight positive pressure.

Although the exact physical and chemical phenomena underlying the outstanding results achieved cannot be stated with certainty, the following is currently believed to be at least a partial explanation of the results obtained.

As soon as the arcs are turned on in the air tight chamber, the $O_2$ in the chamber atmosphere is converted to CO by reaction with the carbon of the electrodes. As a result the partial pressure of $O_2$ above the melt is lower than the partial pressure of $O_2$ in the melt—which is being continuously brought to the melt surface by the vigorous purge—and the $O_2$ leaves the melt, where it immediatly forms CO. In addition the argon which begins to comprise a constituent in the atmosphere above the melt as the process proceeds also further reduces the partial pressure of $O_2$ in the environment above the melt and thereby provides a further force tending to drive $O_2$ from the melt and into the controlled atmosphere above the melt.

Since no hydrogen is permitted to bleed into the system from the ambient atmosphere due to the seal between flanges 13 and 14, a similar phenomena occurs with respect to hydrogen.

As a result of the above described processing, the following advantages of the process, as contrasted with the ladle furnace process, can be noted:
(1) the melt is degassed;
(2) no hydrogen is picked up during the process;
(3) higher yields of Ca and Al are obtained because the $O_2$ content is lowered before Ca and Al additions are made whereby better and more reproducible inclusion shape content is obtained;
(4) higher yields of Mn, Si, and Cr are experienced;
(5) the fume collection problem is eliminated since the system is totally enclosed and the fumes are directed to a mini-dust or fume collector;
(6) no vacuum is required, thereby eliminating ejectors, condensors, cooling water towers, boilers for vacuum, etc.;
(7) no special slags are required;
(8) ideal desulphurization conditions are provided without lance injection.

Although the invention has been described in an examplary fashion, it will be understood that variations may be made within the spirit and scope of the invention. Accordingly it is intended that the scope of the invention be limited solely by the scope of the hereinafter appended claims.

I claim:

1. In a method of refining molten steel following melting the steps of
   isolating molten steel from contact with ambient atmosphere whereby contact with the ambient atmosphere and the molten steel is precluded, and
   while maintaining said molten steel isolated from the ambient atmosphere,
   moving portions of the molten steel which are remote from the surface up to the surface in a manner which exposes said portions of the molten steel to the atmosphere above the surface and
   adding heat to the portions of the molten steel at the surface from a heating arc located above the surface of the molten steel.

2. The method of refining molten steel of claim 1 further characterized in that
   the heat from the heating arc is added to the molten steel during at least a portion of the time that the molten steel is isolated from ambient atmosphere and remote portions are moved to the surface.

3. The method of claim 1 further characterized in that
   the remote portions of the molten steel are moved to the surface and into contact with the atmosphere above the surface by gas agitation.

4. The method of claim 3 further characterized in that
   the gas agitation is derived from an external source of gas which is admitted to the molten steel at a location in the lower region thereof.

5. The method of claim 4 further characterized in that
   the external gas is admitted through porous plug means.

6. The method of claim 4 further characterized in that
   the gas admission point is located above the bottom level of the molten steel.

7. The method of claim 2 further characterized in that
   the heating arc is formed from non-consumable electrodes.

8. The method of claim 7 further characterized in that
   the heating arc is formed from non-consumable electrodes powered by three phase alternating current.

9. The method of claim 2 further characterized in that
   the absolute pressure within the isolated space within which the molten steel is located is substantially atmospheric pressure.

10. The method of claim 9 further characterized in that
    the absolute pressure within the isolated space within which the molten steel is located varies from slightly below to slightly above atmospheric pressure.

11. In a method of refining molten steel following melting, the steps of
    isolating the molten steel from ambient atmosphere, and
    while the molten steel is isolated from ambient atmosphere,
    maintaining the partial pressures of oxygen and hydrogen in the atmosphere above the molten steel at a lower level than the partial pressure of oxygen and hydrogen in the molten steel by
    moving portions of the molten steel which are remote from the surface of the steel up to the surface whereby said portions are exposed to the atmosphere above the molten steel, and
    adding heat to the molten steel by a heating arc maintained between electrode means above the molten steel and the molten steel.

12. The method of claim 11 further characterized in that
    the partial pressures of oxygen and hydrogen decrease with the passage of treatment time.

* * * * *